United States Patent Office 3,522,071
Patented July 28, 1970

3,522,071
METHOD OF PHOSPHOR SURFACE COATING
Yoshiyuki Yokota and Takashi Miyagawa, Hiratsuka-shi, Yasuto Tanaka, Tokyo, and Tatuki Torii, Odawara-shi, Japan, assignors to Dai Nippon Toryo Kabushiki Kaisha, Konohana-ku, Osaka-shi, Japan
Filed Aug. 19, 1966, Ser. No. 573,635
Int. Cl. H01j 31/20
U.S. Cl. 117—33.5           2 Claims

ABSTRACT OF THE DISCLOSURE

The photosensitive properties and stability of phosphor slurries used in photoprinting are improved by surface-coating a phosphor adapted for being applied to the inner surface of a cathode ray tube with slightly soluble acidic oxides, said acidic oxides being oxides of at least one element selected from the group consisting of boron, aluminum, titanium, vanadium, gallium, germanium, arsenic, niobium, molybdenum, tin, antimony, tantalum and tungsten.

---

Figure 1:
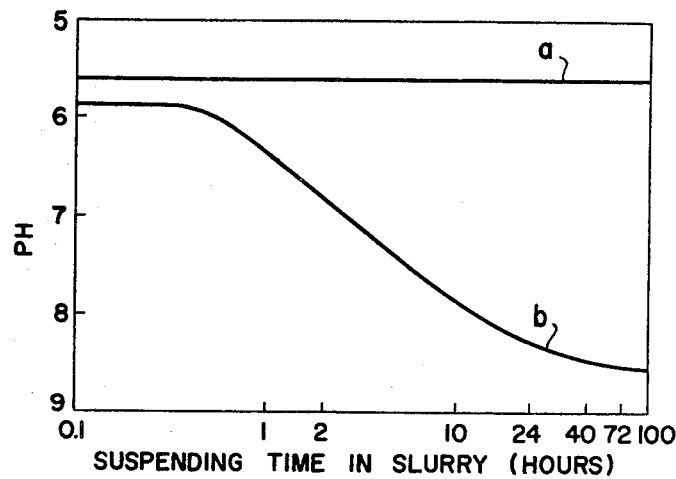

This invention relates to improvements in the photosensitive properties of phosphor suspensions (hereinafter referred to as phosphor slurries) in which the phosphor is dispersed in a polyvinyl alcohol solution rendered photosensitive by a photosensitizer, e.g. ammonium bichromate, for use in photoprinting, and in phosphor screens using the said phosphor slurries.

Phosphors which are known to be used in the formation of phosphor screens for photoprinting include, for example, the phosphors for use in the phosphor screen of a color television picture tube such as blue emitting silver activated zinc sulfide phosphor (ZnS:Ag), green emitting silver activated zinc-cadmium sulfide phosphor ((Zn,Cd)S:Ag) and red emitting silver activated zinc-cadmium sulfide phosphor ((Zn,Cd)S:Ag), europium activated yttrium vanadate phosphor ($YVO_4$:Eu), europium activated yttrium oxide phosphor ($Y_2O_3$:Eu), and europium activated gadolinium oxide phosphor ($Gd_2O_3$:Eu).

These phosphors are applied as phosphor slurries in the formation of phosphor screens. When used as phosphor slurries with or without surface treatment with phosphate or silicate, the phosphors invite chemical reaction or physical or chemical absorption with the ammonium bichromate component in the phosphor slurry, and some phosphors cause considerable changes in the viscosity of the slurry with time. For this reason, it has been difficult to form uniform and homogeneous phosphor screens from the conventional slurries because of the changes in the slurry viscosity and, in addition, repeated use of such phosphor slurries has not been possible. If phosphor screens are made, the photosensitivity for fixing the screens is decreased because of the aforesaid effects of the phosphors upon the bichromate ions serving as the photosensitive agent in the phosphor slurries.

To make up for the decrease of the photosensitivity, it has been proposed to add ammonium bichromate in an amount more than essentially required to the phosphor slurry. However, bichromate ions added in such a large amount have an adverse effect on the emission brightness of the phosphors, and consequently, phosphor screens made from the conventional phosphor slurries have low emission brightness.

Especially when phosphor screens are to be formed of rare earth oxide phosphors such as $Y_2O_3$:Eu phosphor, $Gd_2O_3$:Eu phosphor, etc., the phosphors exhibit poor stability in the phosphor slurries. In short, the phosphor slurries using the above-mentioned phosphors are characterized by considerable changes of viscosity, photosensitivity, and other properties with time due to the deterioration of the phosphor surface.

It is an object of the present invention to improve the stability of the phosphor slurries by the action of a certain reagent which is added either while the phosphors are being subjected to a certain surface treatment or during the preparation of the slurries.

Another object of the invention is to improve the photosensitivity of phosphor screens by increasing the sensitivity of the phosphor slurries.

A further object of the invention is to provide phosphors capable of forming phosphor screens which attain greater emission brightness under excitation by an electron beam than that of screens using conventional phosphors.

Surface treatments or coating processes which have heretofore been employed for phosphors include coating with silicate or phosphate for improving the dispersion of phosphors in solution, adhesion on a glass face, and protection of the phosphors against impurities. However, phosphor slurries formed from phosphors treated as above have shown no changes in the properties from the untreated ones.

The coating process according to the present invention comprises forming or depositing a slightly soluble acidic oxide or a salt thereof on the phosphor surface. When phosphor slurries are prepared from the phosphors treated as above, the slurries are well protected against viscosity changes and can be used several times repeatedly over an extended period of time. Moreover, the phosphor screens formed of the coated phosphors can have increased photosensitivity for fixing and, if the exposure conditions are kept unchanged, the phosphor slurries can contain smaller amounts of ammonium bichromate than those in the slurries of phosphors prepared by conventional process. Thus, the amount of residual chromium in the perfected phosphor screens is smaller and the reduction of brightness of phosphors due to the presence of chromium is less than those in the conventional screens, and therefore brighter screens are obtained in accordance with the invention. When the same amount of ammonium bichromate as in ordinary slurry is added, the phosphor slurry prepared by the use of a phosphor treated according to the invention permits a substantial shortening of the exposure time and hence of the operating time.

Figure 2:
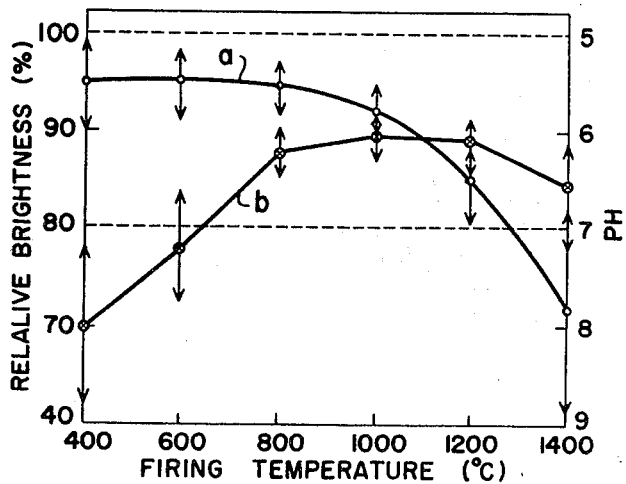
Figure 3:
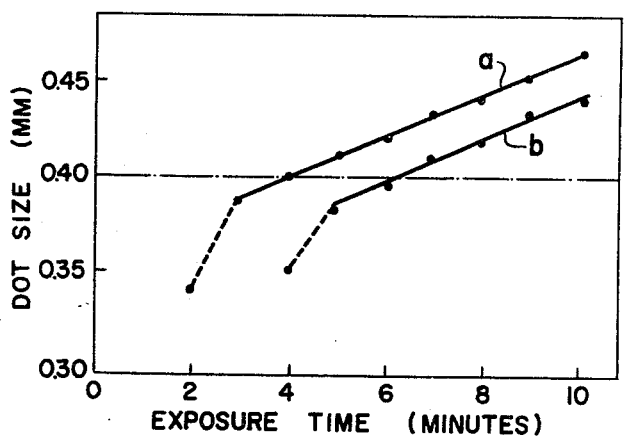

These and other advantages and features of this invention will be better understood as the description proceeds with reference to the accompanying drawings, in which:

FIG. 1 is a diagram showing the pH as a function of time of phosphor slurries prepared from an europium activated yttrium oxide phosphor coated with 5% by weight of tungsten trioxide ($WO_3$) (curve a) and from the same phosphor but which was not coated (curve b);

FIG. 2 is a diagram showing changes of emission brightness (curve a) with firing temperature of an europium activated yttrium oxide phosphor in the course of coating with 5% by weight of tungsten trioxide ($WO_3$) and the pH as a function of time (curve b) of a phosphor slurry prepared from the phosphor; and FIG. 3 is a diagram explaining the relationship between the time of exposure to ultraviolet light irradiated to cause adhesion to the face plate of a cathode ray tube, of phosphor screens formed of silver activated zinc-cadmium sulfide phosphor coated with 2% by weight of germanium oxide ($GeO_2$) (curve a) and of the same phosphor not coated (curve b), and the dot size of the phosphors obtained after development.

In general, according to the present invention, there are two methods of forming or depositing a slightly soluble acidic oxide or its salt on the phosphor surface.

One method consists of mixing a phosphor with a slightly soluble acidic oxide or a compound which can be converted on baking into said slightly soluble acidic oxide, and then baking the mixture, whereby the phosphor crystals and the additive react with each other on baking to form and deposit on the phosphor surface a slightly soluble acidic oxide or a compound in which the same element as the cationic component of the phosphor matrix crystals is incorporated as the cationic component. (For brevity the method is hereinafter referred to as "dry coating.")

The other method comprises either mixing by wet process a phosphor with a slightly soluble acidic oxide or a compound whose cationic component is the same element as the cationic component of the phosphor matrix crystals or depositing the said oxide or compound on the phosphor surface by wet process. (The method is hereinafter referred to as "wet coating.")

The former is effective for oxyacid-type or oxide-type phosphors such as $YVO_4$:Eu, $Y_2O_3$:Eu, etc. which are relatively resistant to impurities. The latter is particularly useful for sulfide-type phosphors such as ZnS:Ag, (Zn,Cd)S:Ag, etc. which sensitively respond to impurities and are most badly affected by baking together with impurities other than the phosphor constituents. Of course the latter method is effective, though to a somewhat lesser extent, for the oxyacid-type and oxide-type phosphors as above mentioned.

For dry coating, the slightly soluble acidic oxides which are suitably used are: Oxides of one or more elements selected from the group consisting of B, Al, Ti, V, Ga, Ge, As, Nb, Mo, Sn, Sb, Ta and W; compounds such as the hydroxides or the ammonium salts of the above elements which can be readily heat decomposed to the oxides as mentioned above; or compounds having a cationic component which is the same element as the cationic component of the phosphor matrix crystals and also having an anionic component which is the oxide or oxides of one or more elements selected from the above group. (For brevity these compounds are hereinafter referred to as acidic oxides.) An important point which must be noted in choosing the acidic oxides is that favorable results are obtained by choosing such acidic oxides whose reaction with phosphors is initiated at relatively low temperatures. The slightly soluble acidic oxides produced by the reaction must not absorb light over the range from the ultraviolet to the infrared zones, particularly from near ultraviolet to visible zones and must not give any adverse effects upon the intrinsic emission properties, e.g. brightness, emission color and persistence, of the phosphors formed of phosphor slurries which are prepared by operating so as to form or deposit a thin layer of the acidio oxide or its compounds on the phosphor surface or to subject the phosphors to a coating process. Furthermore, the acidic oxides must not provide any hindrance to the operation for coating a phosphor slurry of the phosphors treated therewith and must have a relatively low solubility in water or phosphor slurries. Phosphor slurries prepared from phosphors treated with the acidic oxides which satisfy all of the above conditions are neutral or slightly acidic. The acidic oxides give particularly good results when they are of such types which can partially occur in colloidal form in phosphor slurries.

The slightly soluble acidic oxides for use in wet coating desirably have substantially the same properties as those possessed by the slightly soluble acidic oxides which are formed or deposited on the phosphor surface by dry coating.

Essential points of the dry coating procedure are given below. It is important that one or more types of the acidic oxides or compounds which are readily converted on baking into the acidic oxides are added in an amount of 0.05 to 20% by weight, preferably 0.5 to 5% by weight, of the amount of a phosphor, and that the mixture be baked at a temperature which is lower than the temperature required to produce a thorough solid solution of the constituents but higher than the temperature at which the reaction with the phosphor is initiated. Baking treatment under such conditions is believed to cause a reaction between the superficial solid phases of the acidic oxides and phosphor to thereby produce a thin layer of the acidic oxides on the phosphor surface. The reason for which importance is attached to the setting of the baking conditions within the range specified above is explained by the fact that, whereas the activation energy with which the acidic oxides are spread over the phosphor surface in the inter-phase reaction between the acidic oxides and the phosphor may be relatively small, a large activation energy is required in order that the oxides may be diffused into the phosphor and to produce a crystallographical solid solution. It is therefore essential to choose such baking temperature and time that the acid oxides will not be diffused into the phosphor but may remain spread or lightly deposited on the phosphor surface.

An example of the procedure for determining the temperature condition for the solid-phase reaction will be described with respect to a case in which yttrium oxide ($Y_2O_3$:Eu) phosphor is chosen as the phosphor and tungsten trioxide ($WO_3$) or gallium oxide ($Ga_2O_3$) as the acidic oxide. The yttrium oxide phosphor and tungsten trioxide, one mole each, are mixed together, and the mixture is based at predetermined temperatures for one hour periods so as to prepare samples. These samples are examined by X-ray diffraction for the degrees of reaction depending upon the baking temperatures. From samples baked at below 600° C. only those diffraction lines attributable to yttrium oxide and tungsten trioxide can be detected. From samples baked at over 1000° C. the individual diffraction lines of yttrium oxide and tungsten trioxide disappear and the diffraction line of a compound, yttrium tungstate, is detected. From samples baked at temperatures within the range of 700° to 900° C. diffraction lines of yttrium oxide, tungsten trioxide and yttrium tungstate are detected. When a sample is prepared by baking at a temperature within the above specified range and mixed with sodium carbonate, and when the mixture is baked and washed with pure water to remove the surface layer of the phosphor in chemical way, X-ray diffraction will show that the diffraction lines of yttrium tungstate and tungsten oxide have disappeared. In order that the diffraction line disappear, the chemical removal time to be employed is increased with an increase in the baking temperature for dry coating. Since the chemical operation causes dissolution of only tungsten trioxide and yttrium tungstate, the above result testifies to the following fact. If yttrium oxide and tungsten trioxide are mixed and the mixture is heated to 700° C., a thin layer of yttrium tungstate will be formed on the phosphor surface layer by a solid-phase reaction. The thin film is thickened gradually by an increase in the baking temperature. The thin layer of yttrium tungstate thus formed will not give any substantial effect upon the emission mechanism of the phosphor until a certain thickness is attained. Therefore, as will be later described in Example 1, the emission brightness varies with the baking temperature as indicated by curve a in FIG. 2 but remains unchanged at baking temperatures below 800° C. Meanwhile, the pH of the phosphor slurries prepared from the phosphors treated as above becomes slightly acidic with an increase in the baking temperature until the stability of the phosphor slurries is secured as indicated by curve b in FIG. 2. Thus, in dry coating yttrium oxide phosphor with tungsten trioxide, the baking temperature to be used is between 700° and 900° C., preferably 800° C.

For the dry coating of yttrium oxide phosphor with gallium oxide, the baking conditions are chosen as follows. One mole of yttrium oxide phosphor is mixed with one mole of gallium oxide and the mixture is baked at predetermined temperatures for one hour periods to obtain samples. The samples are subjected to X-ray diffraction analysis and the changes of the diffraction lines with the baking temperatures are examined. At baking temperatures below 1000° C. only the diffraction lines of yttrium oxide and gallium oxide are detected. Samples baked at over 1400° C. give only the diffraction line of yttrium oxide. From samples baked at a temperature between 1100° and 1300° C., diffraction lines of yttrium oxide, gallium oxide and yttrium galliumate are obtained. If baking for dry coating is conducted within the above temperature range, preferably at 1200° C., a desired phosphor will result.

In the present invention the dry coating for a given combination of phosphor and acidic oxide requires baking at a temperature within a suitable range as will be apparent from the foregoing description. The pH value of a phosphor slurry prepared from a phosphor which has been coated with an acidic oxide under the above baking conditions remains unchanged after the lapse of 100 hours, as indicated by the curve a in FIG. 1, in contrast to the considerable change with time of the pH value of a phosphor slurry formed of an untreated phosphor (curve b in FIG. 1). The change of pH value toward the alkaline side brings an increase in the phosphor slurry viscosity. This change of viscosity must be avoided whereever possible in the course of application of the slurry to phosphor screen if a good quality screen is to be obtained. Therefore, the fact that the pH of the phosphor slurry according to the invention can remain unchanged for an extended period of time is advantageous in many respects, especially in the process for the manufacture of phosphor screens. For example, in the application to phosphor screens, such stable phosphor slurry can be used repeatedly, thus reducing the cost of the phosphor screens to a considerable extent. Another important feature of the invention is that, if the phosphor slurry which undergoes no change in the pH value is used in producing phosphor screens, films of uniform and homogeneous quality can be formed efficiently and, because the coated films can be kept in satisfactory conditions, the period of subsequent exposure to ultraviolet light can be shortened. These are quite beneficial advantages from the industrial viewpoint.

Phosphors not adapted for dry coating, e.g. sulfide phosphors, may be wet coated in order thereby to give the same effect upon the resulting phosphor slurries as by the dry coating. Wet coating is accomplished by adding to a phosphor a slightly soluble acidic oxide in an amount of 0.05 to 20% by weight, preferably 0.5 to 5% by weight, of the total weight of the phosphor and which is suspended in pure water or a suitable dispersant, thoroughly mixing them altogether, and then drying. It is also possible to add a cationic solution of the said oxide in a suspension of the phosphor and adjust the pH of the suspension toward the neutral or alkaline side, or to hydrolyze or otherwise treat the oxide so that it can deposit in the form of a hydroxide on the surface of phosphor particles, and then dry them altogether to permit the coat to regain the original form of an oxide. Phosphor slurries using the phosphors treated in the foregoing way have essentially the same properties as those of the phosphor slurries prepared from the dry coated phosphors. Alternatively, the slightly soluble acidic oxide may be added at the time of preparation of a phosphor slurry with a water-soluble polyvinyl alcohol, whereby the acidic oxide is adsorbed to the phosphor surface in the same way as in wet coating so as to give the effects in line with the objects of the invention.

The present invention is further described with reference to the following examples which are given for illustration purposes only and not meant to limit the invention.

EXAMPLE 1

Five grams of $WO_3$ was added to 100 g. of $Y_2O_3$:Eu and the mixture was baked at 800° C. for one hour. Since $WO_3$ itself is yellow in color, the mixture was lightly yellow, but as the result of the reaction of $WO_3$ with the phosphor surface on baking, the mixture turned white. The phosphor slurry prepared from the treated phosphor was determined for the pH values after different periods of time during which the slurry was allowed to stand. As indicated by the curve a in FIG. 1, the pH as a function of time showed no change. The curve b in FIG. 1 represents the results of similar determination of pH values of a phosphor slurry formed of an untreated phosphor. As will be apparent from the figure, the phosphor slurry using the untreated phosphor attains a pH of 7 in about two hours after the preparation and at the same time shows an increase in the slurry viscosity. Thus, much difficulties are involved in the coating operation and the quality of resulting phosphor screen is not satisfactory with a conspicuous decrease in photosensitivity to ultraviolet light.

The $Y_2O_3$:Eu phosphor coated in accordance with the invention was allowed to stand in a phosphor slurry for 24 hours. Quantitative analysis showed that the amount of chromium adsorbed to the phosphor during the period was 0.0364%. The analytical value of the chromium adsorption to the untreated $Y_2O_4$:Eu phosphor under the identical conditions was 0.272%. Thus, dry coating of phosphor evidently reduces the amount of chromium adsorbed to the phosphor surface, and naturally the phosphor screen formed of the slurry of coated phosphor attains an increased brightness. The supernatant solution produced after a phosphor slurry prepared from a coated phosphor has been allowed to stand for a long period of time has a tint of reddish orange because of the presence of bichromate ions, but if the phosphor is not treated, the supernatant solution will turn yellow. This proves that the coated phospor in the phosphor slurry has sustained resistance to bichromate ions.

In FIG. 2 there are shown the determined values of phosphor brightness (curve a) obtained by different baking temperatures and changes of pH values (curve b) in 24 hours after the preparation of phosphor slurry. As can be seen from the figure, the pH of the solution shows increased alkalinity at low baking temperatures. If the temperature is excessively high, the pH value will not undergo changes with time but $WO_3$ is diffused inside the phosphor and results in a decrease in the brightness of the phosphor. Here lies the importance of choosing suitable baking conditions as above described. In the present example wherein the $Y_2O_3$:Eu phosphor which gives particularly poor stability in slurry is employed, it is proven nevertheless that the coated phosphor prevents any deterioration of the bichromate ions in the slurry. In other words, this means that the slightly soluble acidic oxide formed by the superficial reaction of the $Y_2O_3$:Eu phosphor and the acidic oxide gives little effect upon the bichromate ions. That the phosphor slurry prepared from the coated $Y_2O_3$:Eu phosphor will not undergo any increase in the pH value or irregular rise of the slurry viscosity for a long period of time is a proof of the fact that bichromate ions also gives no adverse effect such as hydrolysis of the coated phosphor.

EXAMPLE 2

Two grams of $GeO_2$ was added to 100 g. of green emitting (Zn,Cd)S:Ag. Further with the addition of a suitable amount of pure water, the whole mixture in a suitable form of paste was thorough mixed and dried at 150° C. for 12 hours. The panel of a 19-inch color television picture tube using the screen of a phosphor slurry prepared from the phosphor as above treated was subjected to stepped exposure. The size of the resulting phosphor dots was determined in relation to the exposure time. The results are represented by the curve a in FIG. 3. A phosphor slurry prepared from a phosphor of the same type but not treated as above was similarly tested. The results were as given by the curve b in FIG. 3. From the figure it will be seen that the exposure time to obtain the optimum dot size of 0.4 mm. for 19-inch color television picture tubes is shortened, say to about two thirds of the time usually required with uncoated phosphors. It was confirmed that the optimum dot size can also be obtained by preparing the phosphor slurry from the coated phosphor together with ammonium bichromate which is beforehand decreased in amount to two thirds of the usual amount and subjecting the resulting screen to the same exposure time. It will be understood from this that the residual chromium amount in the finished phosphor screen can be decreased by the use of a phosphor coated in accordance with the present example, and therefore the phosphor screen thus obtained is subjected to less adverse effect of the residual chromium and can have a 5 to 10% increase in the brightness.

EXAMPLE 3

To 100 g. of gadolinium oxide phosphor ($Gd_2O_3$:Eu) were added 8 g. of arsenic trioxide ($As_2O_3$), 150 ml. of pure water, and 200 ml. of a 9% aqueous solution of PVA. The mixture was milled and kneaded together by a ball mill for 0.5 to 1 hour. After removal of the balls, 12 ml. of a 10% aqueous solution of ammonium bichromate was added to the mixture thereby to prepare a phosphor slurry. Comparably to the phosphor slurry formed of the coated phosphor as described in Example 1, the slurry prepared as above was appreciably stable with no changes in the pH and viscosity for a prolonged period of time.

EXAMPLE 4

To 100 g. of yttrium vanadate phosphor ($YVD_4$:Eu) were added 8 g. of $GeS_2$, 150 ml. of pure water, and 50 ml. of concentrated hydrochloric acid thereby to prepare a suspension. The suspension was heated to 50–80° C., cooled, and dried. In the course of the procedure $GeS_2$ was decomposed into $GeO_2$ and $H_2S$. $GeO_2$ deposited on the phosphor surface while $H_2S$ was removed. The phosphor coated in this way was used in preparing a phosphor slurry. The phosphor slurry showed increased stability and photosensitivity like the slurry prepared from the wet coated phosphor as described in Example 2.

EXAMPLE 5

Three grams of boric anhydride ($B_2O_3$) was added to 100 g. of yttrium oxide phosphor ($Y_2O_3$:Eu) and was thoroughly mixed up. The mixture was baked at 650° C. for one hour. The phosphor slurry prepared of the phosphor sample thus obtained exhibited the same effects as in Example 1.

EXAMPLE 6

Three grams of tin oxide ($SnO_2$) was added to 100 g. of zinc sulfide phosphor (ZnS:Ag) and mixed up by dry process. The phosphor slurry prepared of the phosphor sample thus obtained showed good stability and increased photosensitivity as in Example 2.

EXAMPLE 7

Two grams of gallium oxide ($Ga_2O_3$) was added to 100 g. of red emitting zinc-cadmium sulfide phosphor ((Zn,Cd)S:Ag) and thoroughly mixed up by dry process. The phosphor slurry prepared from the sample thus obtained had substantially the same properties as those of the slurry according to Example 6.

EXAMPLE 8

To 100 g. of gadolinium oxide phosphor ($Gd_2O_3$:Eu), 2 g. of molybdenum oxide ($MoO_3$) and 80 ml. of pure water were added to form a homogeneous paste and then the paste was dried. The phosphor slurry prepared using the sample thus obtained was as effective as the slurry described in Example 1.

What is claimed is:

1. A method of surface coating a phosphor for stabilizing a slurry of said phosphor to be used in photo printing, said method comprising depositing 0.05 to 20% by weight of a slightly soluble acidic oxide onto the surface of a zinc sulfide phosphor, a zinc-cadmium sulfide phosphor, a rare earth oxide phosphor or a rare earth oxyacidate phosphor by mixing said acidic oxide with the phosphor without any liquid dispersant and baking the mixture at a temperature from 600° to 1400° C. in air until the mixture components no longer exist separately and do not react to form a solid solution, said acidic oxide being an oxide of at least one element selected from the group consisting of boron, aluminum, titanium, vanadium, gallium, germanium, arsenic, niobium, molybdenum, tin, antimony, tantalum and tungsten.

2. A method of surface coating a phosphor for stabilizing a slurry of said phosphor to be used in photo printing, said method comprising depositing 0.05 to 20% by weight of a slightly soluble acidic oxide onto the surface of a zinc sulfide phosphor, a zinc-cadmium sulfide phosphor, a rare earth oxide phosphor, or a rare earth oxyacidate phosphor by mixing the corresponding ammonium salt, hydroxide or sulfide with the phosphor without any liquid dispersant and baking the mixture at a temperature from 600° to 1400° C. in air to convert said ammonium salt, hydroxide or sulfide to the slightly soluble acidic oxide until the phosphor and the thus formed acidic oxide no longer exist separately and do not react to form a solid solution, said acidic oxide being an oxide of at least one element selected from the group consisting of boron, aluminum, titanium, vanadium, gallium, germanium, arsenic, niobium, molybdenum, tin, antimony, tantalum and tungsten.

References Cited
UNITED STATES PATENTS

| | | | |
|---|---|---|---|
| 2,586,304 | 2/1952 | Coltman et al. | 117—33.5 XR |
| 2,867,587 | 1/1959 | Donahue et al. | 117—33.5 XR |
| 2,878,137 | 3/1959 | Butler et al. | 117—33.5 XR |
| 2,971,859 | 2/1961 | Sisneros et al. | 117—33.5 XR |
| 3,264,133 | 8/1966 | Brooks | 117—100 XR |

ALFRED L. LEAVITT, Primary Examiner

W. F. CYRON, Assistant Examiner

U. S. Cl. X.R.

117—100; 252—301.6